June 6, 1939. C. P. ROGERS 2,161,682
WINDSHIELD WIPER
Filed Aug. 6, 1937 2 Sheets-Sheet 1

Inventor
Colman Patrick Rogers

By Clarence A. O'Brien
Hyman Berman
Attorneys

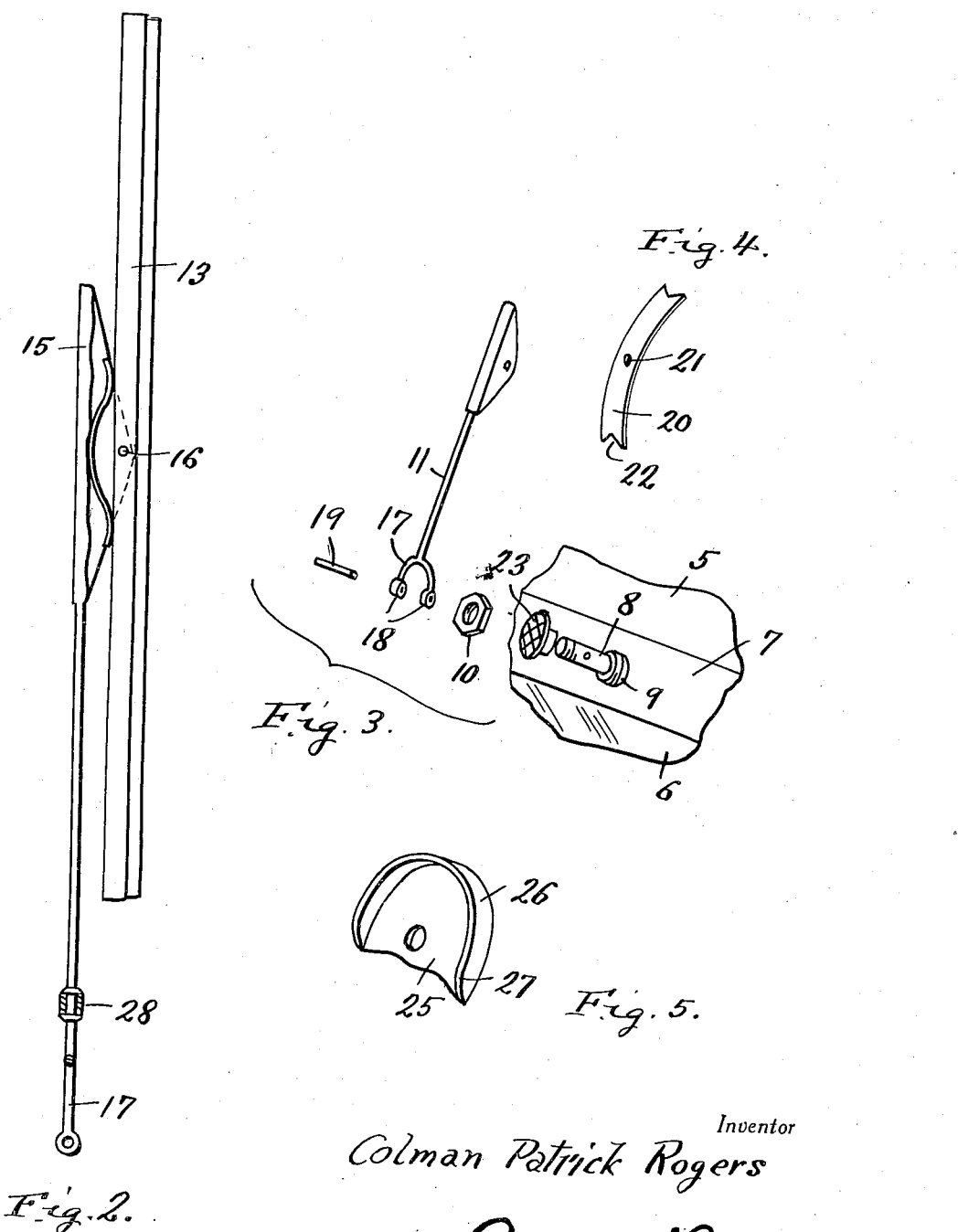

Patented June 6, 1939

2,161,682

UNITED STATES PATENT OFFICE 2,161,682

WINDSHIELD WIPER

Colman P. Rogers, Santa Barbara, Calif.

Application August 6, 1937, Serial No. 157,790

1 Claim. (Cl. 15—250)

This invention relates to new and useful improvements in windshield wipers and the principal object of the invention is to provide a windshield wiper which will perform efficiently in a rotary motion.

Another important object of the invention is to provide a windshield wiper of double blade construction which at the same time is capable of performing in a rotary motion.

These and various other important objects and advantages of the invention will become apparent to the reader of the following specification.

In the drawings:

Figure 2 is a side elevational view of one blade assembly of the wiper with portions broken away.

Figure 3 is a perspective exploded view of certain parts of the wiper.

Figure 4 is a perspective view of the spring.

Figure 5 is a perspective view of the riser.

Figure 1:
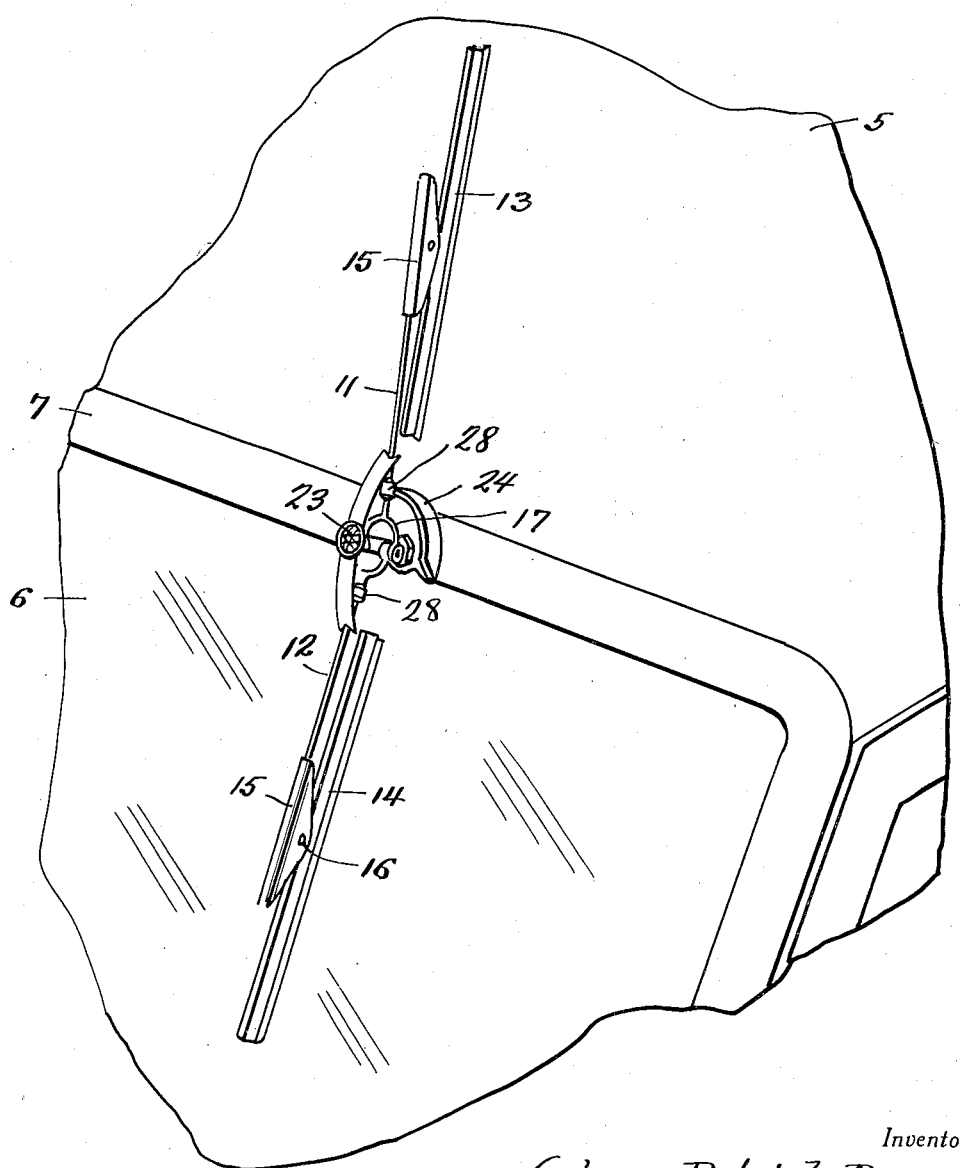
Figure 1 represents a perspective view of a portion of an automobile with the windshield wiper mounted for use.

Referring to the drawings wherein like numerals designate like parts, it can be seen that numeral 5 represents the top of an automobile while numeral 6 represents the windshield having the usual frame 7.

As is clearly shown in Figure 3, the drive shaft for the wiper is denoted by numeral 8 and extends through the frame 7. Numeral 9 represents the bearing for the shaft 8 and this is equipped with the nut 10.

As shown in Figure 1, numerals 11—12 represent the arms of the wipers 13—14, respectively, each arm 11—12 being provided with the channeled structure 15 for receiving the mid-portion of the corresponding wiper and in which the wiper is rockably supported as at 16.

The inner ends of these arms 11—12 are provided with yokes 17, the yoke of the arm 12 fitting within the yoke of the arm 11 so that the apertured heads 18 are aligned to receive the pin 19 which extends through the shaft 8.

An arcuate strip spring member 20 has an opening 21 at its mid-point for receiving the shaft 8 and its ends are notched as at 22 for engagement with the arms 11—12. This spring 20 is held in place by the cap nut 23 and this spring serves to maintain the wipers tensionally against the windshield 6 during their rotary motion.

However, to prevent the arm 11 and wipers 13 from being distorted over the roof 5 of the car, a riser 24 is provided. This riser consists of a plate 25 having the semi-circular flange 26 thereon with the ends 27 inclined to permit riding onto the flange 26 of the rollers 28, which rollers are carried by the arms 11—12.

Thus as the blade units swing to pass above the windshield, their rollers 28 will ride on to the riser 24 so that the elevated arm and blade will not be distorted over the roof of the car.

Furthermore, as can be seen in Figure 1, the plate 25 is held against the windshield frame 27 by the nut 10.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In combination with a windshield frame, a rotary shaft disposed through one side portion of the frame, a windshield wiper having an arm swingably secured to the shaft and adapted for engagement with the glass of the windshield, spring means for urging the wiper against the windshield, and a track on the frame partly surrounding the shaft and against which the wiper arm can ride and be supported as it swings off of the windshield.

COLMAN P. ROGERS.